US010255121B1

(12) United States Patent
He et al.

(10) Patent No.: US 10,255,121 B1
(45) Date of Patent: Apr. 9, 2019

(54) STACKABLE SYSTEM EVENT CLEARINGHOUSE FOR CLOUD COMPUTING

(75) Inventors: Ping He, Cary, NC (US); Joseph Gugliemino, Berlin, MA (US); Hwai-Yeng Chan, Cary, NC (US); Wai C. Yim, Merrimack, NH (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 577 days.

(21) Appl. No.: 13/400,992

(22) Filed: Feb. 21, 2012

(51) Int. Cl.
*G06F 9/54* (2006.01)

(52) U.S. Cl.
CPC ..................... *G06F 9/541* (2013.01)

(58) Field of Classification Search
None
See application file for complete search history.

(56) References Cited

U.S. PATENT DOCUMENTS

| | | | |
|---|---|---|---|
| 3,704,363 A * | 11/1972 | Salmassy et al. | 714/704 |
| 6,336,119 B1 * | 1/2002 | Banavar | G06F 17/30961 |
| 6,446,136 B1 * | 9/2002 | Pohlmann | G06F 11/3006 |
| | | | 707/999.104 |
| 6,868,540 B2 * | 3/2005 | Hunsinger et al. | 718/100 |
| 7,424,716 B1 * | 9/2008 | Goswami et al. | 719/318 |
| 7,739,720 B2 * | 6/2010 | Samuelsson | G06F 21/55 |
| | | | 726/1 |
| 8,584,132 B2 * | 11/2013 | Gupta et al. | 718/104 |
| 8,589,949 B2 * | 11/2013 | Biazetti et al. | 719/318 |
| 2002/0052980 A1 * | 5/2002 | Sanghvi et al. | 709/318 |
| 2002/0065864 A1 * | 5/2002 | Hartsell | H04L 41/5009 |
| | | | 718/100 |
| 2004/0002958 A1 * | 1/2004 | Seshadri | G06F 17/30867 |
| 2004/0068481 A1 * | 4/2004 | Seshadri | G06Q 30/02 |
| 2007/0067409 A1 * | 3/2007 | Eslambolchi | H04L 63/0281 |
| | | | 709/217 |
| 2007/0130363 A1 * | 6/2007 | Barros | G06Q 10/107 |
| | | | 709/238 |
| 2008/0282142 A1 * | 11/2008 | Butlin et al. | 715/234 |
| 2009/0222539 A1 * | 9/2009 | Lewis | G06F 19/322 |
| | | | 709/221 |
| 2009/0293067 A1 * | 11/2009 | Singh et al. | 719/318 |
| 2010/0211826 A1 * | 8/2010 | Villella et al. | 714/39 |
| 2010/0235879 A1 * | 9/2010 | Burnside et al. | 726/1 |

(Continued)

FOREIGN PATENT DOCUMENTS

WO    WO 2007/149340 A2 * 12/2007 ............. G06F 19/00

*Primary Examiner* — Charles E Anya
*Assistant Examiner* — Phuong N Hoang
(74) *Attorney, Agent, or Firm* — Anderson Gorecki LLP

(57) ABSTRACT

An event clearinghouse engine is used with a data storage system to modify event disposition associated with components. A separate component disposition table is provided for each component. The component disposition table specifies different sets of disposition modifications for different types of events as indicated by event ID. A global disposition rule mapping table includes disposition modifications which are applied to all events. Per-vendor and per-tenant tables may be used to specify disposition modifications for particular vendors and tenants. Mode-specific tables such as a rescue/recovery mode table may be used to specify disposition modifications when the storage system is in a particular mode. The tables may be implemented in stages, including parallel and serial application.

27 Claims, 10 Drawing Sheets

(56) References Cited

U.S. PATENT DOCUMENTS

| | | | |
|---|---|---|---|
| 2011/0085527 A1* | 4/2011 | Kuhl | H04M 1/274566 |
| | | | 370/338 |
| 2011/0113072 A1* | 5/2011 | Lee | G06Q 10/10 |
| | | | 707/802 |
| 2011/0154117 A1* | 6/2011 | Danielson et al. | 714/37 |
| 2011/0320550 A1* | 12/2011 | Lawson | G06F 9/542 |
| | | | 709/206 |
| 2012/0151278 A1* | 6/2012 | Tsantilis | G06F 11/079 |
| | | | 714/48 |
| 2012/0159268 A1* | 6/2012 | LeCroy et al. | 714/57 |
| 2013/0110943 A1* | 5/2013 | Menon | G06Q 10/107 |
| | | | 709/206 |
| 2014/0273994 A1* | 9/2014 | Upendran | H04W 4/12 |
| | | | 455/414.1 |

* cited by examiner

STACKABLE SYSTEM EVENT CLEARINGHOUSE FOR CLOUD COMPUTING

CROSS-REFERENCE TO RELATED APPLICATIONS

NA

BACKGROUND OF THE INVENTION

The invention is generally related to electronic data storage devices, and more particularly to system event processing. Software components and hardware subsystems may be configured to generate event notifications. Examples of events include, but are not limited to, operational status changes and errors, system configuration changes and statistics updates. The utility of an event notification may depend on the technical knowledge of the user who receives the notification. For example, error codes may be useful for IT personnel, but have no meaning to the average user. This can be problematic in complex, multi-vendor systems which are utilized by multiple users via a network.

SUMMARY OF THE INVENTION

In accordance with an aspect, a method comprises: collecting events associated with a plurality of components; for each event, modifying disposition of the event as indicated by a component disposition indicator, where a separate component disposition indicator is provided for each component of the plurality of components; and processing each event in accordance with a modified disposition associated with that event.

In accordance with another aspect, computer program code stored in non-transitory memory comprises: logic which collects events associated with a plurality of components; for each event, logic which modifies disposition of the event as indicated by a component disposition indicator, where a separate component disposition indicator is provided for each component of the plurality of components; and logic which processes each event in accordance with a modified disposition associated with that event.

In accordance with another aspect, apparatus comprises: a data storage system including data storage resources; and at least one storage management device which: collects events associated with a plurality of components; for each event, modifies disposition of the event as indicated by a component disposition indicator, where a separate component disposition indicator is provided for each component of the plurality of components; and processes each event in accordance with a modified disposition associated with that event.

Advantages associated with at least some aspects include coordinated management of event processing to support cloud storage computing. Complex multi-vendor systems may include components which are configured to process events in a manner which is undesirable within the system. However, customized reprogramming of components may be impractical. Certain aspects help to solve these problems by collecting events and enabling per-component modification of event disposition. Further, disposition modification can be specified by event type. Per-vendor and per-tenant disposition instructions may be used to specify disposition modifications for particular vendors and tenants. A global disposition rule mapping indicator may specify disposition modifications which are applied to all events. Mode-specific indicators such as a rescue/recovery mode table may be used to specify disposition modifications when the storage system is in a particular mode. The event disposition modification indicators may be implemented in hierarchical stages, and may include serial and parallel processing. The event disposition modification indicators may also be dynamically updated. Consequently, highly customized event disposition rules can be implemented and updated in a coordinated manner.

Other features and advantages will become apparent in view of the detailed description and figures.

DETAILED DESCRIPTION

Figure 1:
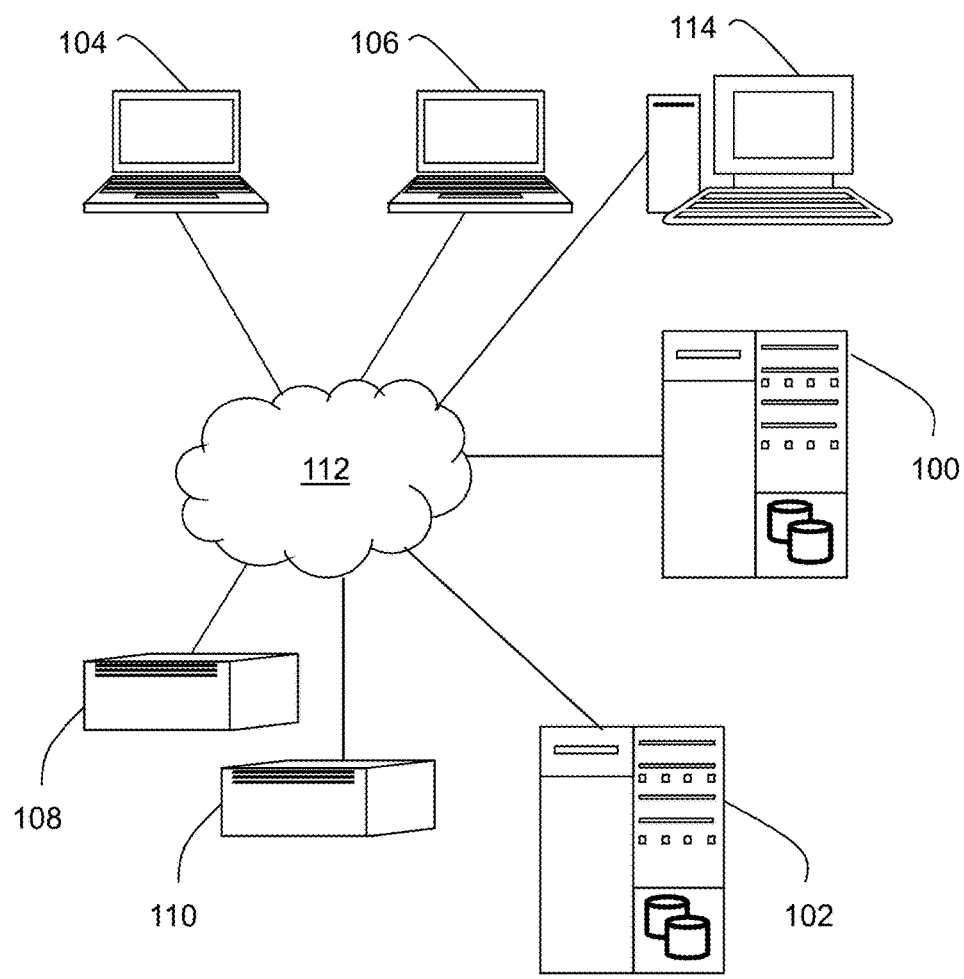
FIG. 1 illustrates a networked "cloud" environment in which event processing is implemented.

FIG. 1 illustrates a networked "cloud" environment in which event processing is implemented. Devices associated with the cloud may include network storage systems 100, 102 which are connected to devices such as user terminals 104, 106 and servers 108, 110 via a network 112. The servers and terminals may utilize the storage systems by performing data read and write operations. An infrastructure management station 112 may also be connected to the network for managing the network storage systems. The network storage systems may be mirrored systems which can be managed locally or remotely via the management station 114. The storage systems may be complex, multi-vendor platforms. It should be understood, however, that the invention is not limited to use with storage systems, user terminals, servers or any other particular type of device.

Figure 2:
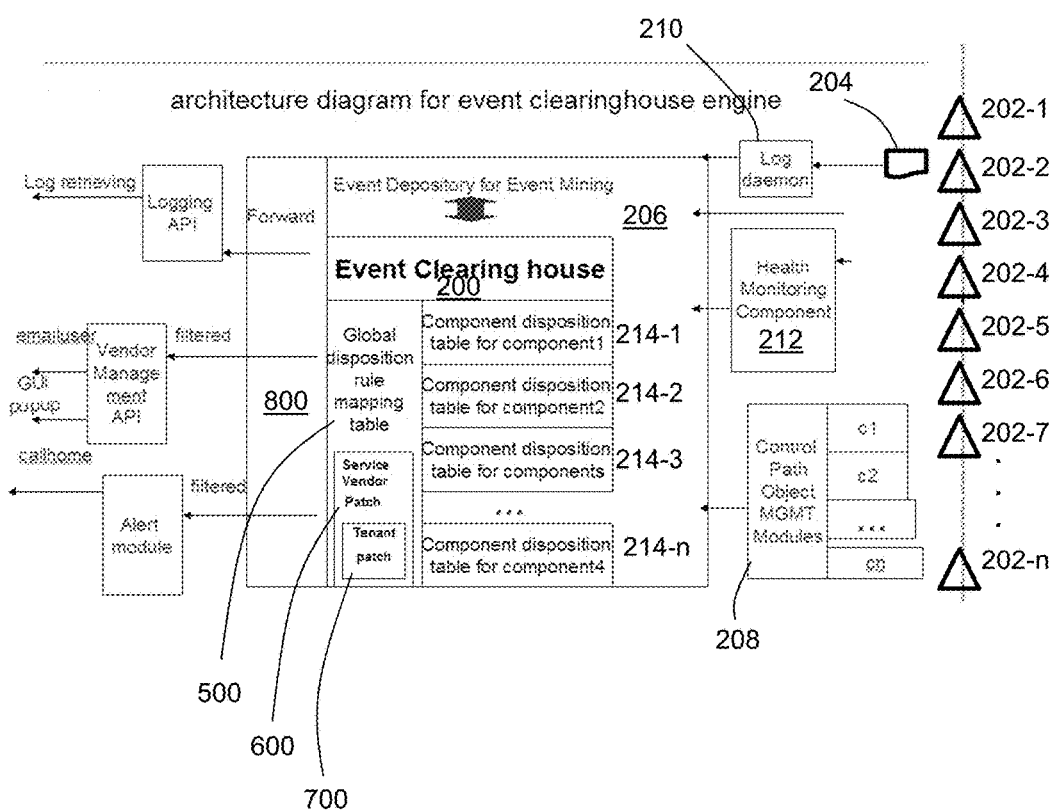
FIG. 2 illustrates an event clearinghouse engine.

Referring to FIGS. 1 and 2, an event clearinghouse engine 200 is used to process events associated with components 202-1 through 202-n of the network storage system, e.g., event 204 from component 202-2. Components can include software modules and hardware subsystems. Events can include any operations for which a message is generated by a software module or hardware subsystem. The event clearinghouse engine includes computer program code stored in non-transitory memory and processed using a general purpose microprocessor, dedicated purpose-built hardware, or both. The clearinghouse engine may be stored and operated on different devices in a distributed manner, be implemented on one device, or as different instances on different devices or platforms. For example, and without limitation, each network storage system may operate an event clearinghouse engine.

One function performed by the event clearinghouse engine 200 is collection of events, i.e., "event mining." Components 202-1 through 202-n may be configured to handle events in various ways, and it is not always practical to change the manner in which a component handles events. If the component can be configured such that recipients of event notifications can be selected then an event depository 206 is specified. However, the event clearinghouse engine may also monitor recipients for event notifications. For example, the event clearinghouse engine may utilize control path object management modules 208, event daemons 210 and health monitoring components 212 to discover, track and record event generation, operating status and errors. Regardless of how they are obtained, the events are collected in the event depository 206 for processing.

Figure 3:
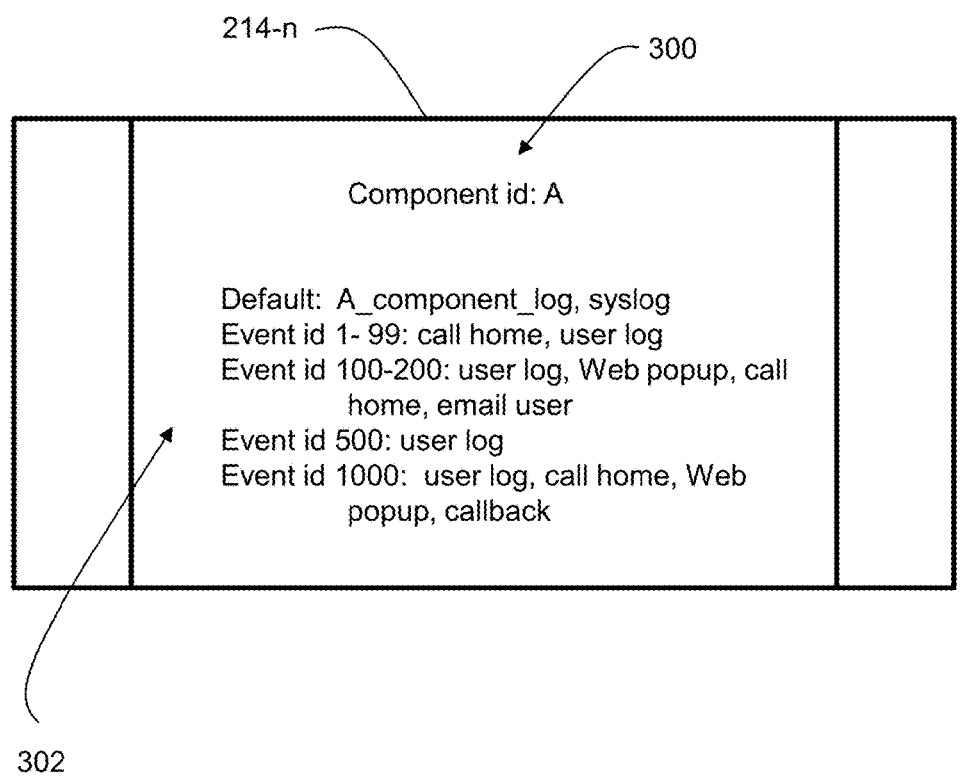
FIG. 3 illustrates a component disposition table.
Figure 4:
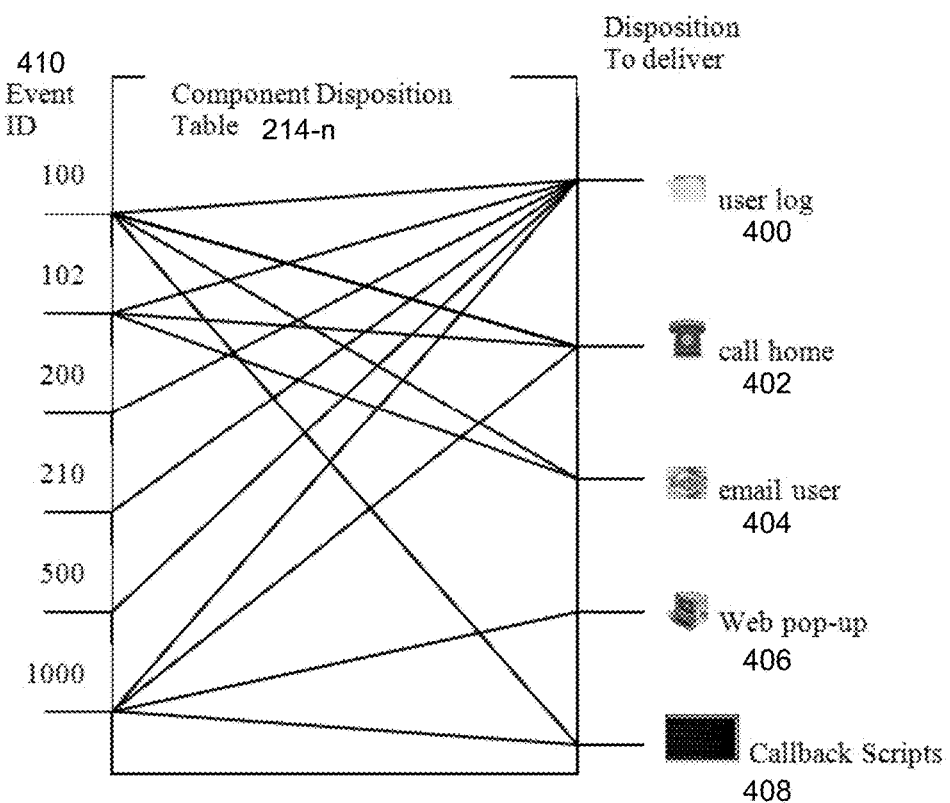
FIG. 4 illustrates operation of a component disposition table.

Referring to FIGS. 2, 3 and 4, collected events may be processed on a per-component basis using component disposition tables 214-1 through 214-n. The event clearinghouse engine may include a separate component disposition table for each supported component, e.g., table 214-1 for component 202-1, table 214-2 for component 202-2, etc. Each component disposition table includes a component ID field 300 which may be used to match logged events with the corresponding disposition table for the component which generated the logged event. The component disposition table also includes disposition modification instructions 302. For example, and without limitation, the disposition modification instructions can redefine event disposition destinations, e.g., logging 400, call home 402, email support 404, GUI popup 406 etc., and can also redefine what corrective scripts 408 to utilize, e.g., File system check and verification tool. A particular set of disposition modification instructions may be specified for a particular type of event using an event ID 410. In particular, an event ID or event ID range is associated with a set of disposition instructions, and an incoming event having a matching ID or an ID within the specified range is processed in accordance with the associated set of instructions. A default set of instructions for events having an ID which does not match a specified ID or fall within a specified range may also be specified. In the illustrated example (see FIG. 3) an event having an ID in the range 1-99 associated with component 202-n prompts a call home and is recorded in a user log. An event having an ID in the range 100-200 associated with component 202-n is recorded in a user log and prompts a web popup, call home and email to the user. An event having ID 500 associated with component 202-n is recorded in a user log. An event having an ID 1000 from component 202-n is recorded in a user log and prompts a call home, web popup and callback. An event having an ID which does not match any entry is processed in accordance with the default instructions, e.g., recorded in a log associated with component 202-n and also in a system level log.

Figure 5:
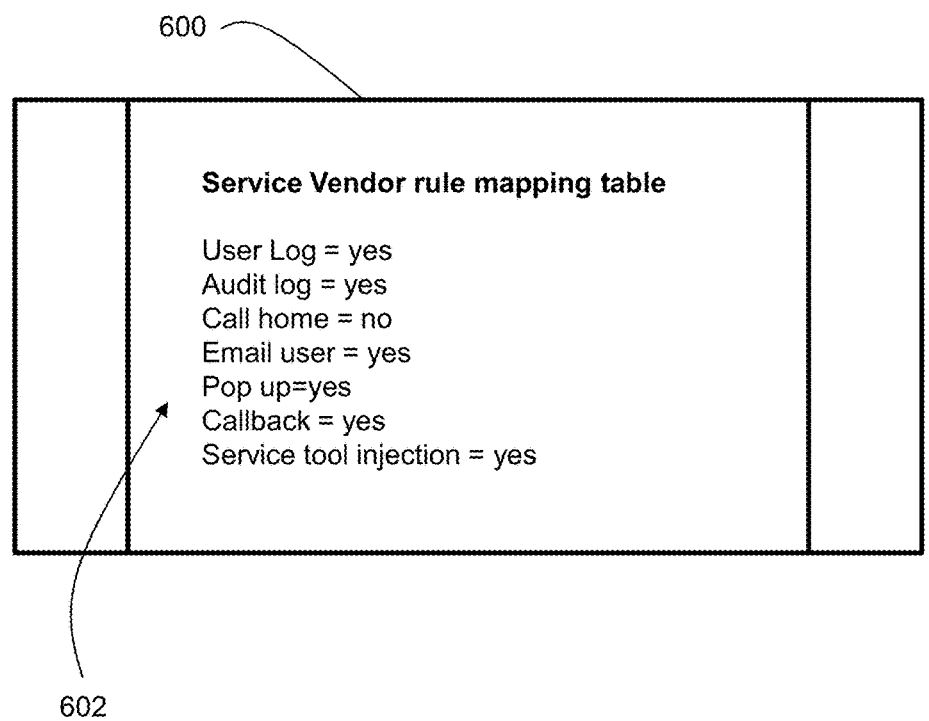
FIG. 5 illustrates a service vendor rule mapping table.

Referring to FIGS. 2 and 5, the event clearinghouse engine 200 also includes a global rule mapping table 500 which may includes various patch tables. For example, the global disposition rule mapping table may include a service vendor rule mapping table patch 600 which specifies default rules 602 for all events associated with a specified service vendor. A device, platform or system may include components supplied by different vendors. The service vendor rule mapping table helps mitigate the need for vendors to customize components for the device, platform or system. Events may be associated with a particular vendor using a vendor ID field or by using a table that associates component IDs with vendors. The service vendor rule mapping table overrides corresponding instructions specified by the component disposition tables. For example, if the component disposition table for component 202-n specifies Call home for a particular event but Call home is set to "no" in the service vendor rule mapping table for the service vendor associated with component 202-n then Call home is not implemented or explicitly disabled for use. Further, the service vendor rule mapping table instructions indicated as "yes" are performed regardless of whether they are specified in the component disposition tables associated with the vendor. In other words, the service vendor rule mapping table enables vendor-specific exclusion and inclusion of particular disposition rules. The service vendor rule mapping table may be dynamically updated by changing settings and adding or deleting rules while the storage system is in operation.

Figure 6:
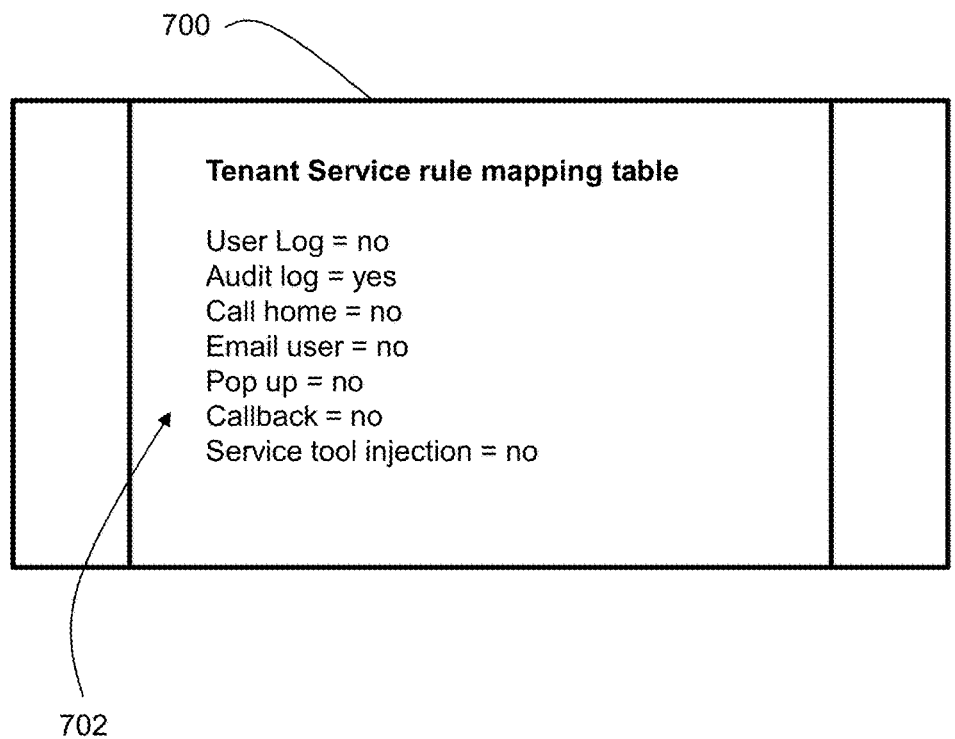
FIG. 6 illustrates a tenant service rule mapping table.

Referring to FIGS. 2 and 6, the global disposition rule mapping table 500 may also include a tenant service rule mapping table patch 700 which specifies default rules 702 for all events associated with a specified tenant. A device, platform or system may be used by multiple tenants. Events may be associated with a particular tenant using a tenant ID field or by using a table that associates component IDs with tenants. The tenant service rule mapping table overrides corresponding instructions specified by the service vendor and component disposition tables. For example, if the component disposition table and vendor service tables specified Call home for a particular event but Call home is set to "no" in the tenant service rule mapping table then Call home is not implemented or explicitly disabled for use. Further, the tenant service mapping table instructions indicated as "yes" are performed regardless of whether they are specified in the service vendor and component disposition tables associated with the tenant. In other words, the tenant service rule mapping table enables tenant-specific exclusion and inclusion of particular disposition rules. There may be one tenant service rule mapping table per tenant. The tenant service rule mapping table may be dynamically updated by changing settings and adding or deleting rules while the storage system is in operation.

Figure 7:
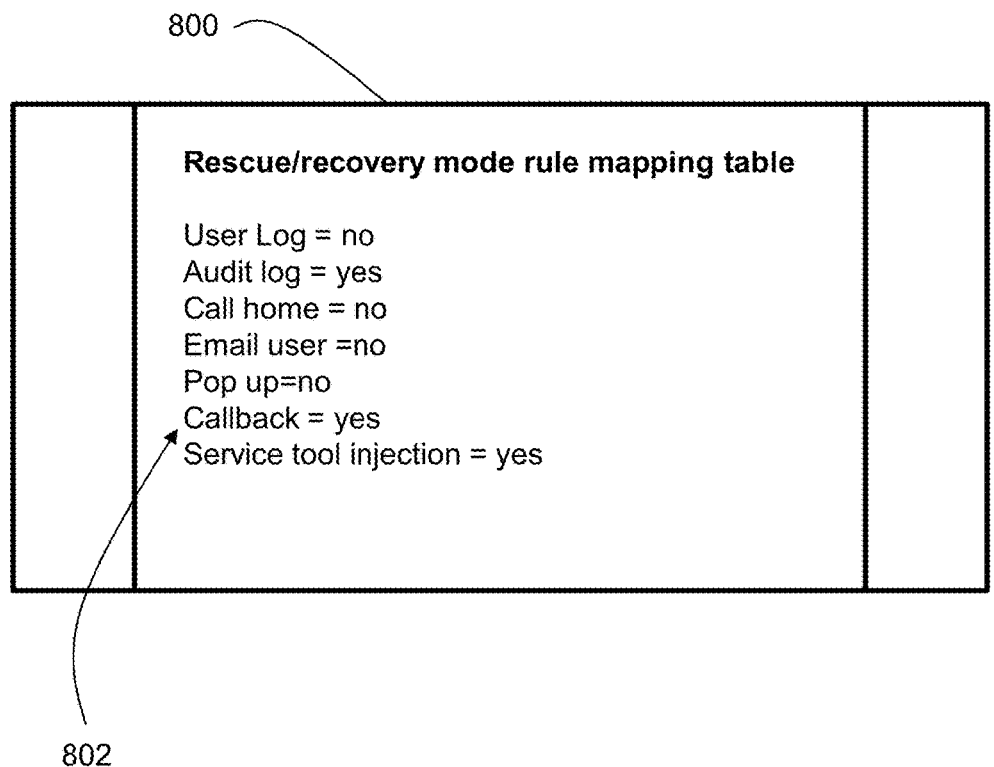
FIG. 7 illustrates a rescue/recovery mode rule mapping table.

Referring to FIGS. 2 and 7, the global disposition rule mapping table 500 may include a mode-specific rule mapping table patch 800 such as a rescue/recovery mode rule mapping table which specifies default rules 802 for all events while in rescue/recovery modes. The mode-specific rule mapping table overrides corresponding instructions from the component disposition tables. The mode-specific rule mapping table may be dynamically updated by changing settings and adding or deleting rules while the storage system is in operation.

Figure 8:
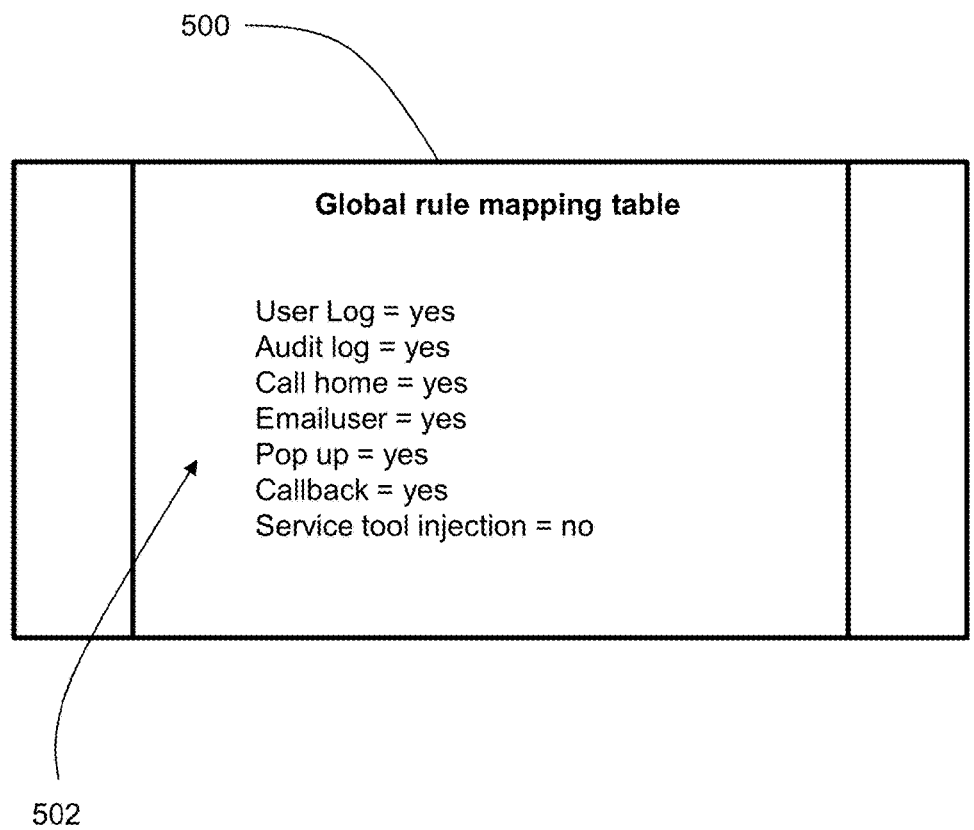
FIG. 8 illustrates a global rule mapping table.

Referring to FIGS. 2 and 8, the event clearinghouse engine 200 also includes a global rule mapping table 500 which specifies default rules. The default rules are applied to all events. For example, and without limitation, the default rules are applied to all events from all components of all service vendors and tenants. The global rule mapping table 500 overrides corresponding instructions specified by component disposition tables 214-1 through 214-n, and also the service vendor rule mapping table, tenant service rule mapping table, and mode-specific rule mapping table. For example, if the component disposition table for component 214-n specified service tool injection for a particular event but service tool injection is set to "no" in the global rule mapping table 500 then service tool injection is not implemented or explicitly disabled for use. Further, the global rule mapping table instructions indicated as "yes" are performed regardless of whether they are specified in the component disposition tables. In other words, the global rule mapping table enables global exclusion and inclusion of particular disposition modification rules 502. The global rule mapping table may be dynamically updated by changing settings and adding or deleting rules while the storage system is in operation.

Figure 9:
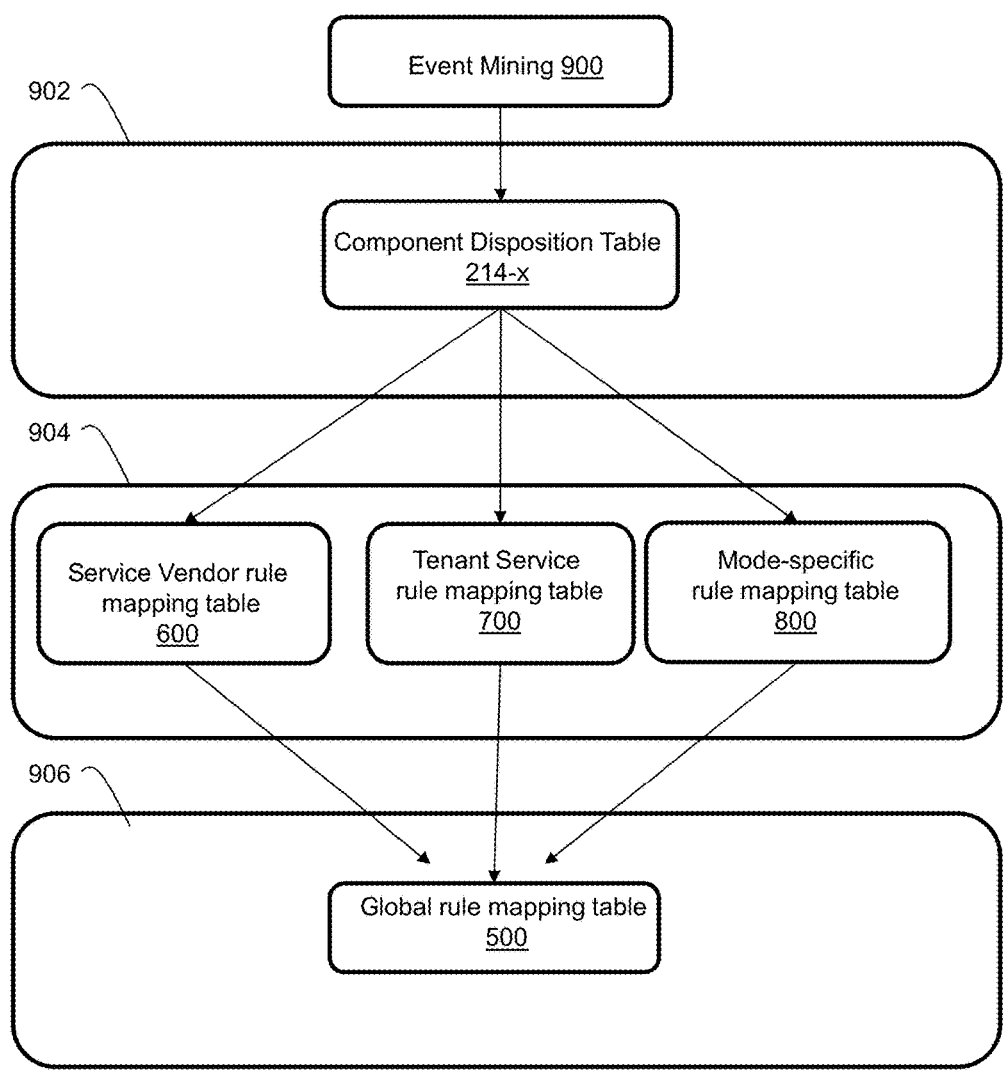
FIG. 9 is a flow diagram illustrating event processing in stages.

FIG. 9 is a flow diagram illustrating event processing in stages. In response to an event originating from a source component at an event mining stage 900, an event disposition producer generates an event disposition indicator from the product level at an initial disposition generation stage 902 in accordance with a corresponding component disposition table 214-x selected from the group of component disposition tables. At a modifier stage 904 the event disposition indicator may be further modified in accordance with processing in parallel using the service vendor rule mapping table 600, the tenant service rule mapping table 700, and the mode-specific rule mapping table 800. At a filter stage 906 the event dispositions are further processed in accordance with the global rule mapping table 500.

Figure 10:
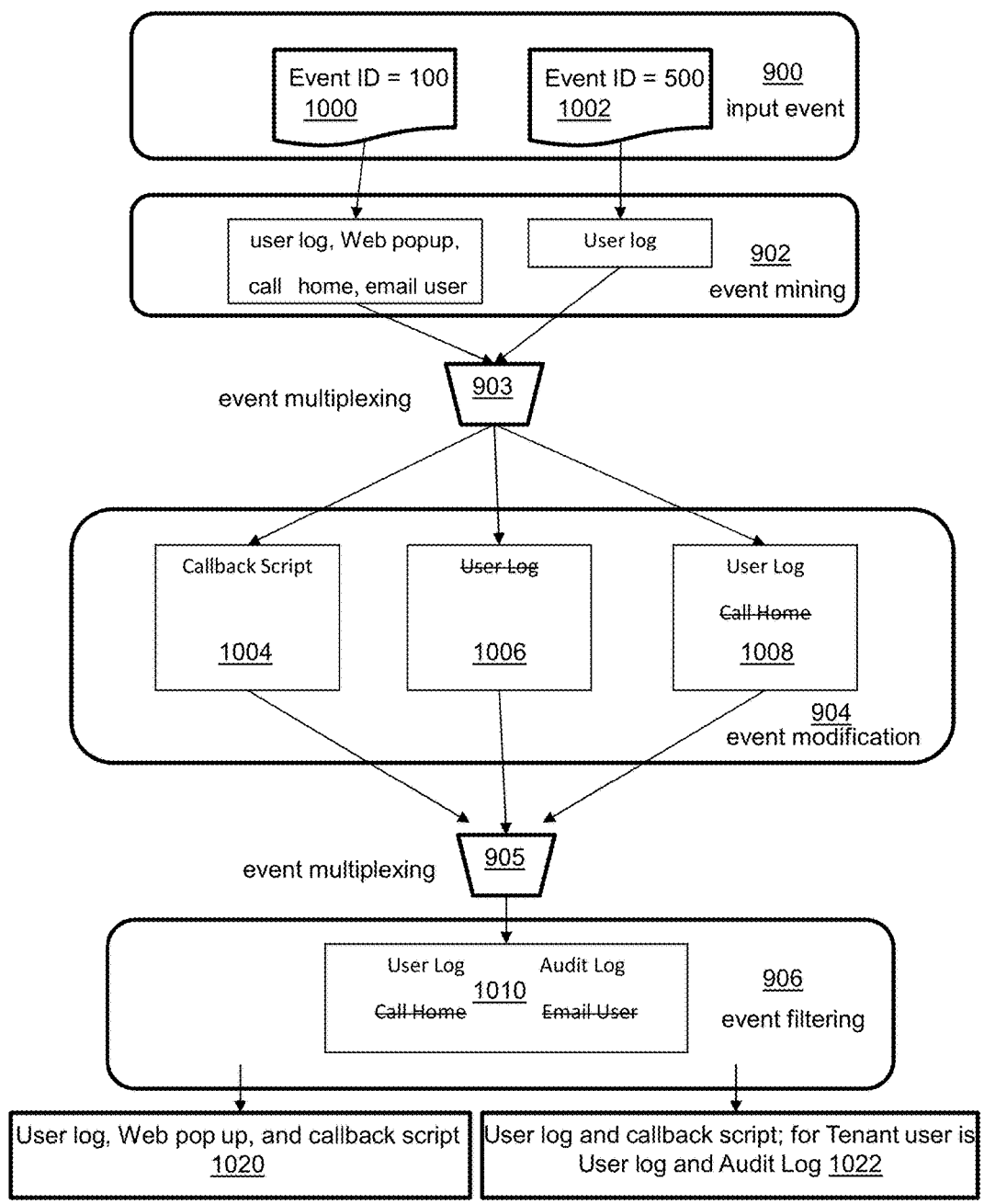
FIG. 10 is a flow diagram of an example of event processing in stages.

FIG. 10 is a flow diagram of an exemplary implementation of event processing in stages. The event mining stage 900 results in collection of two events 1000, 1002 from a component being placed in the event depository. Event 1000 has ID 100 and event 1002 has ID 500. At the initial event disposition stage 902, event disposition is determined based on event ID using the component disposition table corresponding to the component which generated the events, e.g., table 214-n (FIG. 3). The example component disposition table specifies user log, Web popup, call home and email user for event ID 100. The component disposition table also specifies user log for event ID 500. The dispositions based on both event IDs are multiplexed at stage 903, and the output is split (replicated) for processing in parallel at the modifier stage 904. At the modifier stage 904, the service vendor rule mapping table 1004 for the vendor of the component specifies a callback script which is added to the disposition of events 1000 and 1002. The tenant service rule mapping table 1006 for the tenant associated with the events specifies cancel write to user log, so that disposition instruction is removed. The mode-specific rule mapping table 1008 specifies write to user log and cancel call home so those dispositions are added and removed, respectively. The resulting outputs of the modifier stage 904 are multiplexed at stage 905 and provided to the filter stage 906. At the filter stage the disposition instructions are again processed to yield modified disposition instructions in accordance with the global rule mapping table 1010, e.g., by adding writes to user log and audit log, and by removing call home and email user. After Step 906, the final disposition 1020 of Event ID 100 (1000) for Service vendor is User log, Web pop up, and callback script; for Tenant user is User log and Audit Log. The final disposition 1022 of Event ID 500 (1002) for Service vendor is User log and callback script; for Tenant user is User log and Audit Log. It will be appreciated that arrangement of the stages creates a hierarchy. Further, serial and parallel processing within a stage results in multiple sets of dispositions. The illustrated arrangement of stages and tables is merely exemplary. Any number, type and arrangement of tables and stages might be utilized.

While the invention is described through the above exemplary embodiments, it will be understood by those of ordinary skill in the art that modification to and variation of the illustrated embodiments may be made without departing from the inventive concepts herein disclosed. Moreover, while the embodiments are described in connection with various illustrative structures, one skilled in the art will recognize that the system may be embodied using a variety of specific structures. Accordingly, the invention should not be viewed as limited except by the scope and spirit of the appended claims.

What is claimed is:

1. A method comprising:
    collecting events associated with a plurality of components comprising at least one of software modules and hardware subsystems, the events comprising at least one of component operational status changes, component errors, component system configuration changes and component statistics updates;
    for at least one of the events collected from one of the components, modifying disposition of the event as indicated by a component disposition indicator, including selecting a set of multiple recipients for notification of the event, where the multiple recipients are not specified by the component and a separate component disposition indicator is provided for each component of the plurality of components; and
    processing each event in accordance with a modified disposition associated with that event, including sending the notification of the event to the set of recipients.

2. The method of claim 1 wherein collecting events includes utilizing at least one of: control path object management modules, event daemons and health monitoring components.

3. The method of claim 1 wherein the component disposition indicator includes multiple sets of disposition instructions indexed by event identifier, and including selecting one of the sets based on an event identifier associated with an event being processed.

4. The method of claim 1 wherein the component disposition indicator includes a default set of instructions for events having an identifier which does not match a specified identifier or range, and including selecting the default set based on an event identifier associated with an event being processed.

5. The method of claim 1 including, for each event, further modifying disposition of the event as indicated by a global component disposition indicator, where a single global component disposition indicator is provided for all components of the plurality of components.

6. The method of claim 5 wherein further modifying disposition of the event includes overriding disposition of the event as indicated by the component disposition indicator.

7. The method of claim 1 including further modifying disposition of the event as indicated by a service vendor indicator, where a single service vendor indicator is provided for all events associated with a specified service vendor.

8. The method of claim 1 including further modifying disposition of the event as indicated by a tenant indicator, where a single tenant indicator is provided for all events associated with a specified tenant.

9. The method of claim 1 including further modifying disposition of the event as indicated by a mode-specific indicator, where a single mode-specific indicator is provided for all events when the specified mode is active.

10. Computer program code stored in non-transitory memory comprising:
    logic which collects events associated with a plurality of components comprising at least one of software modules and hardware subsystems, the events comprising at least one of component operational status changes, component errors, component system configuration changes and component statistics updates;
    for at least one of the events collected from one of the components, logic which modifies disposition of the event as indicated by a component disposition indicator, including selecting a set of multiple recipients for notification of the event, where the multiple recipients are not specified by the component and a separate component disposition indicator is provided for each component of the plurality of components; and logic which processes each event in accordance with a modified disposition associated with that event, including sending the notification of the event to the set of recipients.

11. The program code of claim 10 wherein the logic which collects events utilizes at least one of: control path object management modules, event daemons and health monitoring components.

12. The program code of claim 10 wherein the component disposition indicator includes multiple sets of disposition instructions indexed by event identifier, and including logic which selects one of the sets based on an event identifier associated with an event being processed.

13. The program code of claim 10 wherein the component disposition indicator includes a default set of instructions for events having an identifier which does not match a specified identifier or range, and including logic which selects the default set based on an event identifier associated with an event being processed.

14. The program code of claim 10 including, for each event, logic which further modifies disposition of the event as indicated by a global component disposition indicator, where a single global component disposition indicator is provided for all components of the plurality of components.

15. The program code of claim 14 wherein the logic which further modifies disposition of the event overrides disposition of the event as indicated by the component disposition indicator.

16. The program code of claim 10 including logic which further modifies disposition of the event as indicated by a service vendor indicator, where a single service vendor indicator is provided for all events associated with a specified service vendor.

17. The program code of claim 10 including logic which further modifies disposition of the event as indicated by a tenant indicator, where a single tenant indicator is provided for all events associated with a specified tenant.

18. The program code of claim 10 including logic which further modifies disposition of the event as indicated by a mode-specific indicator, where a single mode-specific indicator is provided for all events when the specified mode is active.

19. Apparatus comprising:
a data storage system including data storage resources; and
at least one storage management device which:
collects events associated with a plurality of components comprising at least one of software modules and hardware subsystems, the events comprising at least one of component operational status changes, component errors, component system configuration changes and component statistics updates;
for at least one of the events collected from one of the components, modifies disposition of the event as indicated by a component disposition indicator, including selecting a set of multiple recipients for notification of the event, where the multiple recipients are not specified by the component and a separate component disposition indicator is provided for each component of the plurality of components; and
processes each event in accordance with a modified disposition associated with that event, including sending the notification of the event to the set of recipients.

20. The apparatus of claim 19 wherein the at least one storage management device collects events by utilizing at least one of: control path object management modules, event daemons and health monitoring components.

21. The apparatus of claim 19 wherein the component disposition indicator includes multiple sets of disposition instructions indexed by event identifier, and wherein the at least one storage management device selects one of the sets based on an event identifier associated with an event being processed.

22. The apparatus of claim 19 wherein the component disposition indicator includes a default set of instructions for events having an identifier which does not match a specified identifier or range, and wherein the at least one storage management device selects the default set based on an event identifier associated with an event being processed.

23. The apparatus of claim 19 wherein, for each event, the at least one storage management device further modifies disposition of the event as indicated by a global component disposition indicator, where a single global component disposition indicator is provided for all components of the plurality of components.

24. The apparatus of claim 23 wherein further modification of disposition of the event overrides disposition of the event as indicated by the component disposition indicator.

25. The apparatus of claim 19 wherein the at least one storage management device further modifies disposition of the event as indicated by a service vendor indicator, where a single service vendor indicator is provided for all events associated with a specified service vendor.

26. The apparatus of claim 19 wherein the at least one storage management device further modifies disposition of the event as indicated by a tenant indicator, where a single tenant indicator is provided for all events associated with a specified tenant.

27. The apparatus of claim 19 wherein the at least one storage management device further modifies disposition of the event as indicated by a mode-specific indicator, where a single mode-specific indicator is provided for all events when the specified mode is active.

* * * * *